(12) United States Patent
Kimura

(10) Patent No.: US 9,459,003 B2
(45) Date of Patent: Oct. 4, 2016

(54) ELECTRONIC EQUIPMENT

(75) Inventor: Yuuichirou Kimura, Saitama (JP)

(73) Assignee: NEC CORPORATION, Tokyo (JP)

( * ) Notice: Subject to any disclaimer, the term of this patent is extended or adjusted under 35 U.S.C. 154(b) by 6 days.

(21) Appl. No.: 13/881,265

(22) PCT Filed: Nov. 9, 2011

(86) PCT No.: PCT/JP2011/006254
§ 371 (c)(1),
(2), (4) Date: Jul. 9, 2013

(87) PCT Pub. No.: WO2012/063479
PCT Pub. Date: May 18, 2012

(65) Prior Publication Data
US 2013/0279163 A1    Oct. 24, 2013

(30) Foreign Application Priority Data

Nov. 10, 2010  (JP) ................................ 2010-251388

(51) Int. Cl.
*F21V 9/00* (2015.01)
*F21V 33/00* (2006.01)
*H04M 1/22* (2006.01)
*G09F 13/22* (2006.01)
(Continued)

(52) U.S. Cl.
CPC ............. *F21V 33/00* (2013.01); *G02B 6/0068* (2013.01); *G02B 6/0073* (2013.01); *G02B 6/0095* (2013.01); *G09F 13/22* (2013.01); *H04M 1/22* (2013.01); *H04M 1/0283* (2013.01)

(58) Field of Classification Search
USPC .............. 362/227, 231, 234, 249.01, 249.02, 362/249.14, 800
See application file for complete search history.

(56) References Cited

U.S. PATENT DOCUMENTS

2004/0061814 A1* 4/2004 Kim et al. ...................... 349/65
2005/0052883 A1    3/2005 Qi et al.
2005/0057933 A1    3/2005 Suzuki
(Continued)

FOREIGN PATENT DOCUMENTS

CN    1648970 A    8/2005
CN    1760731 A    4/2006
(Continued)

OTHER PUBLICATIONS

International Search Report for PCT/JP2011/006254 dated Feb. 14, 2012.
(Continued)

*Primary Examiner* — Andrew Coughlin
*Assistant Examiner* — Meghan Ulanday
(74) *Attorney, Agent, or Firm* — Sughrue Mion, PLLC

(57) ABSTRACT

Electronic equipment according to the present invention includes: an illumination unit that is mounted so as to form the surface of a housing and is capable of transmitting a light from inside the housing to outside; and a light-emitting unit that emits a light to the illumination unit from inside the housing and is mounted inside the housing. Then, the light-emitting unit includes a plurality of RGB LEDs (Light Emitting Diodes) that can emit red, green and blue lights, and the respective RGB LEDs are arranged so that part of a light emitted to the illumination unit by a predetermined one of the RGB LEDs and part of a light emitted to the illumination unit by another of the RGB LEDs overlap each other before entering the illumination unit.

6 Claims, 6 Drawing Sheets

(51) Int. Cl.
   *F21V 8/00* (2006.01)
   *H04M 1/02* (2006.01)

(56) References Cited

U.S. PATENT DOCUMENTS

| | | | | |
|---|---|---|---|---|
| 2008/0151527 | A1* | 6/2008 | Ueno | C09K 11/584 |
| | | | | 362/84 |
| 2009/0231248 | A1 | 9/2009 | Dorff et al. | |
| 2010/0246197 | A1* | 9/2010 | Takahashi | F21S 6/004 |
| | | | | 362/430 |

FOREIGN PATENT DOCUMENTS

| | | |
|---|---|---|
| CN | 101552268 A | 10/2009 |
| CN | 101737680 A | 6/2010 |
| EP | 1515526 A1 | 3/2005 |
| JP | 09283805 A | 10/1997 |
| JP | 2001358807 A | 12/2001 |
| JP | 2003-317516 A | 11/2003 |
| JP | 2005-84620 A | 3/2005 |
| JP | 2006-87572 A | 4/2006 |
| JP | 2007-328309 A | 12/2007 |
| JP | 2009-87538 A | 4/2009 |
| KR | 100890266 B1 | 3/2009 |
| WO | 2008023789 A1 | 2/2008 |

OTHER PUBLICATIONS

Extended European Search Report, dated Apr. 2, 2014, issued by the European Patent Office, in counterpart Application No. 11840673.5.
Communication dated Nov. 2, 2014 from the State Intellectual Property Office of P.R. China in counterpart application No. 201180053652.6.
Communication dated Jan. 26, 2016 from the Japanese Patent Office issued in corresponding Application No. 2010-251388.
Communication dated Dec. 3, 2015, from the State Intellectual Property Office of People's Republic of China in counterpart Application No. 201180053652.6.

\* cited by examiner

ELECTRONIC EQUIPMENT

CROSS REFERENCE TO RELATED APPLICATIONS

This application is a National Stage of International Application No. PCT/JP2011/006254 filed Nov. 9, 2011, claiming priority based on Japanese Patent Application No. 2010-251388 filed Nov. 10, 2010, the contents of all of which are incorporated herein by reference in their entirety.

TECHNICAL FIELD

The present invention relates to electronic equipment, more specifically, relates to electronic equipment including an illumination unit for transmitting light from inside to outside.

BACKGROUND ART

As a structure for causing part of electronic equipment to light, some electronic equipment has an illumination structure which optically connects an illumination unit made of a light-transmissive member such as resin and glass and mounted on the external face of a housing and a light-emitting means such as an LED (Light Emitting Diode) by using a light guide plate and which makes a light emitted by the LED pass through the illumination unit. In this case, by configuring to apply the light emitted by the light-emitting means from substantially the normal direction to an illuminated face of the illumination unit, attenuation of the light amount due to reflection is suppressed. Moreover, by providing the LED serving as the light-emitting means with a diffuser lens and forming bumps on the illuminated faces of the light guide plate and illumination unit, the light is almost regularly reflected, and the whole illumination unit is made to uniformly light.

On the other hand, electronic equipment which is light and compact and needs power saving, such as current mobile phones, has limitations of the placement area of the illumination structure, power consumption of the illuminating means, and cost in the number of the illuminating means. Moreover, a request for increase of a visual function such as color illumination is made. Therefore, development of electronic equipment which satisfies these limitations and request is desired.

[Patent Document 1] Japanese Unexamined Patent Application Publication No. 2007-328309

An example of a technique relating to a problem of limitations of the placement area, power consumption and cost relating to the illumination structure as mentioned above is disclosed in Patent Document 1. The technique disclosed in Patent Document 1 aims for reduction of power consumption and implementation cost by causing a light emitted by a backlight to diagonally enter a light polarization prism.

However, a task of realization of increase of the visual function, which is the request relating to electronic equipment described above, has not been solved yet. In other words, there is a problem for electronic equipment that it is impossible to increase the visual functionality for users at low cost.

SUMMARY

Accordingly, an object of the present invention is to increase user satisfaction with the visual functionality of electronic equipment at low cost.

In order to achieve the object, electronic equipment as an exemplary embodiment of the present invention includes: an illumination unit that is mounted so as to form a surface of a housing and is capable of transmitting a light from inside the housing to outside; and a light-emitting unit that emits a light to the illumination unit from inside the housing and is mounted inside the housing.

Then, the light-emitting unit includes a plurality of RGB LEDs (Light Emitting Diodes) that can emit red, green and blue lights, and the respective RGB LEDs are arranged so that part of a light emitted to the illumination unit by a predetermined one of the RGB LEDs and part of a light emitted to the illumination unit by another of the RGB LEDs overlap each other before entering the illumination unit.

With the configurations described above, the present invention can increase the visual functionality of electronic equipment at low cost.

EXEMPLARY EMBODIMENTS

<First Exemplary Embodiment>

Figure 1:
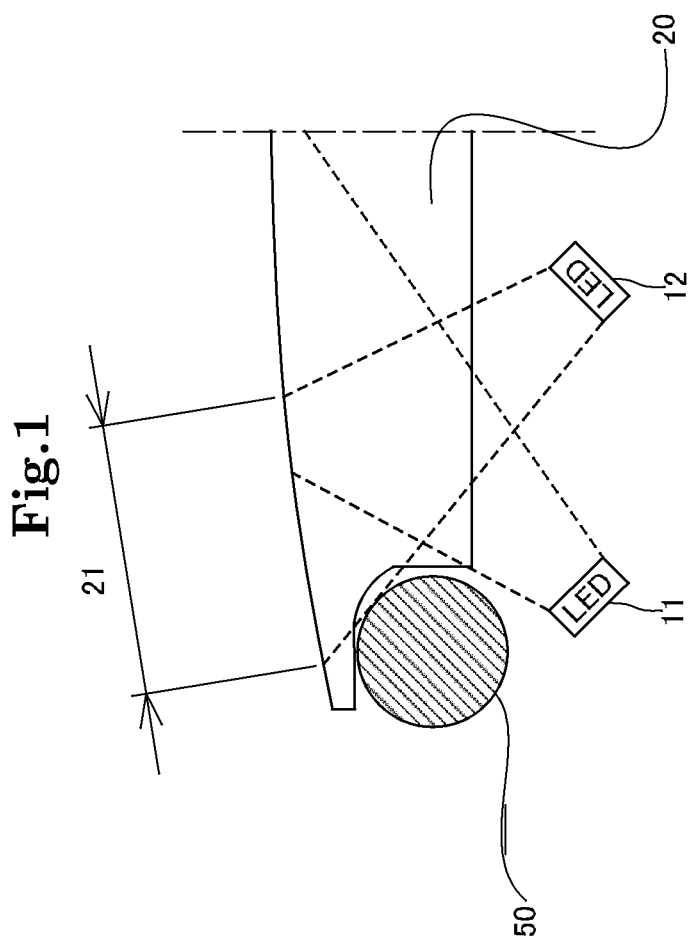
FIG. 1 is a view for describing a configuration according to the present invention.
Figure 2:
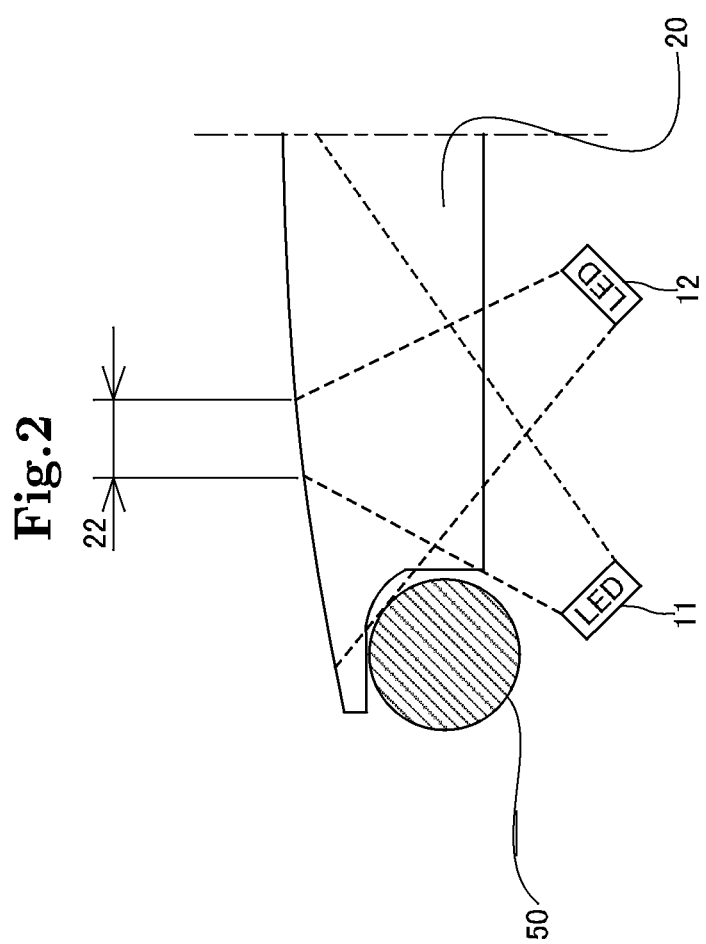
FIG. 2 is a view for describing the configuration according to the present invention.
Figure 3:
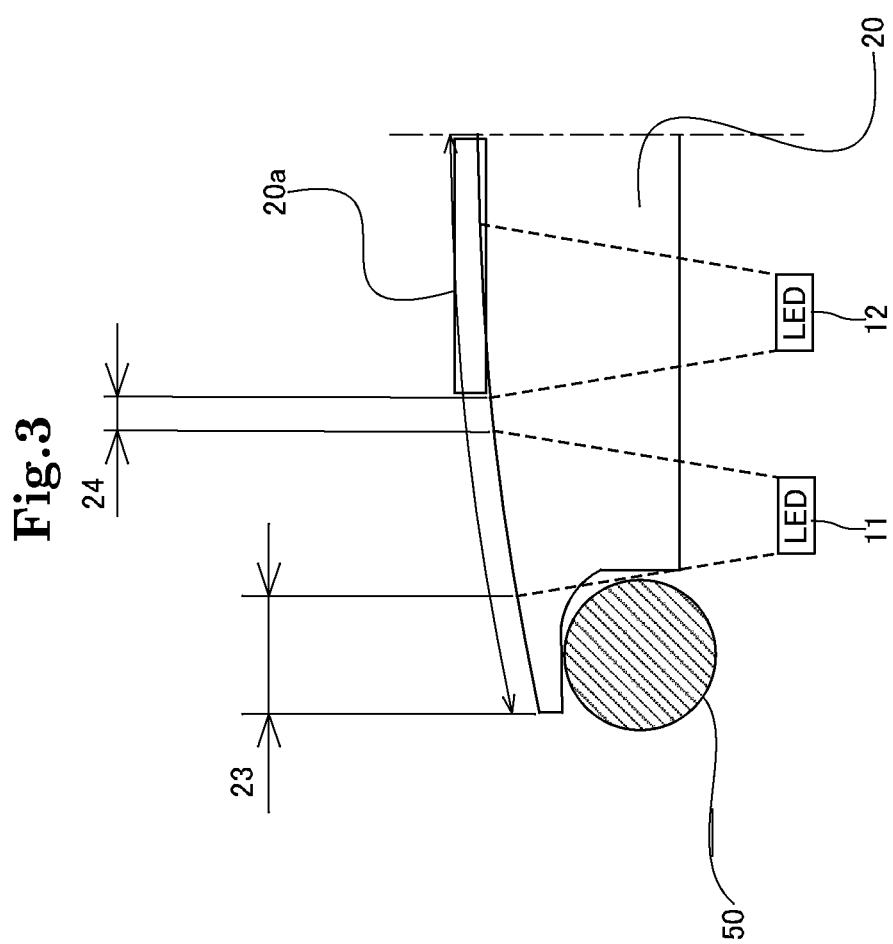
FIG. 3 is a view showing a comparison example with the present invention.
Figure 4:
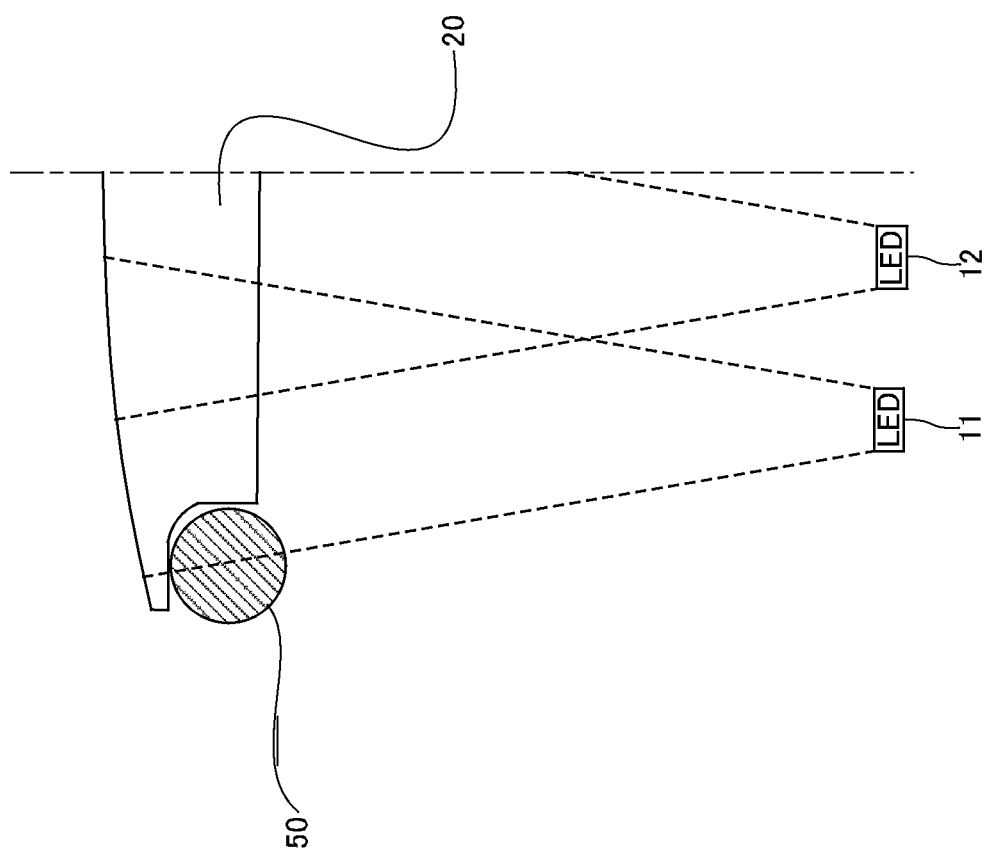
FIG. 4 is a view showing the comparison example with the present invention.
Figure 5:
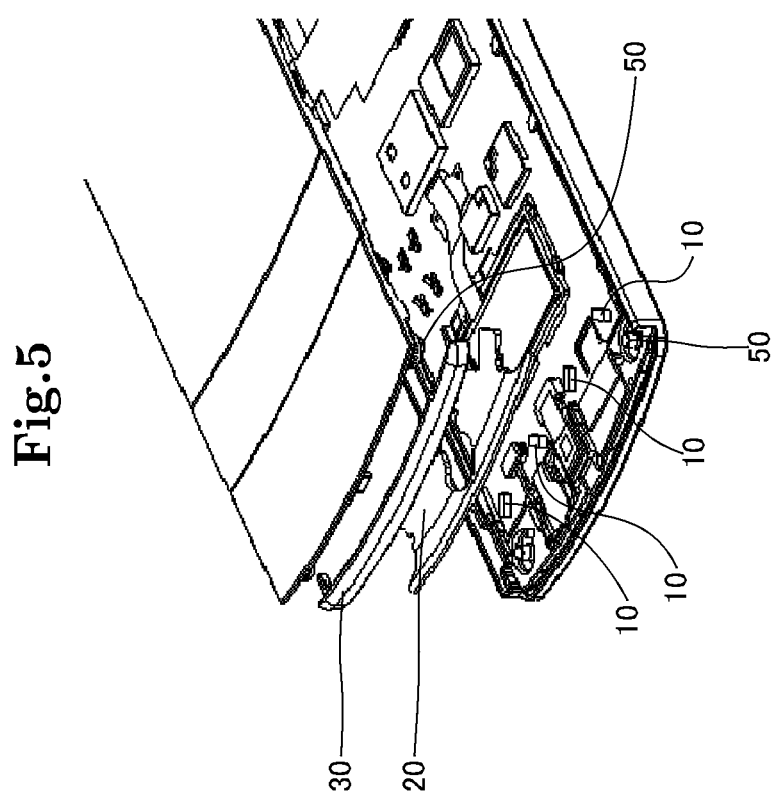
FIG. 5 is a view showing a configuration of a specific example of the present invention.
Figure 6:
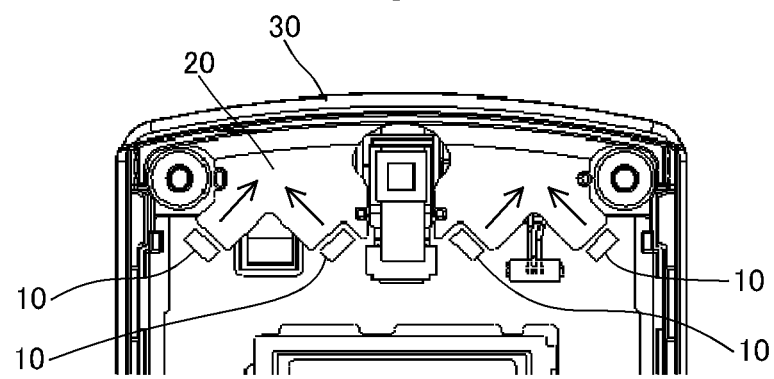
FIG. 6 is a view showing the configuration of the specific example of the present invention.

A first exemplary embodiment of the present invention will be described with reference to FIGS. 1 to 6. FIGS. 1 and 2 are views for describing a configuration of part of electronic equipment according to the present invention, and FIGS. 3 and 4 are views showing a comparison example with the present invention. FIGS. 5 and 6 are views showing a specific example of the configuration of the electronic equipment according to the present invention.

The electronic equipment according to the present invention is, for example, a mobile phone. The electronic equipment is provided with a structure which causes an illumination unit formed on part of the surface of a housing to light, and is featured by this structure. The electronic equipment according to the present invention is not limited to a mobile phone, and may be any electronic equipment.

In this exemplary embodiment, for example, as shown in FIGS. 5 and 6, a lens unit 30 evenly formed along one end portion of one of housings of a folding mobile phone is an illumination unit that lights when illuminated from inside. To this lens unit 30, a light guide plate 20 made of polycarbonate or the like and formed on the inner side of the housing is optically connected. The electronic equipment is configured so that lights emitted by a plurality of LEDs (Light Emitting Diodes) 10 serving as light-emitting units enter as shown by arrows in FIG. 6, these lights are transmitted by the light guide plate 20 to enter the lens unit 30 from inside, and the lens unit 30 lights when seen from outside the housing. The LEDs 10 in this exemplary embodiment are RGB LEDs (Light Emitting Diodes) that can emit red (R), green (G) and blue (B) lights.

This exemplary embodiment is featured by arrangement of the LEDs 10. With reference to FIGS. 1 and 2, arrangement of the LEDs 10 and an illumination state of lights emitted by the LEDs 10 will be described. Although the lens unit 30 that lights when the lights emitted by the LEDs 10 (11 and 12) enter is not illustrated in FIGS. 1 and 2, the lens unit 30 is connected to an upper end face portion of the light guide plate 20 (i.e., a face denoted by reference numerals 21 and 22), and thus, an illumination state of this portion will be described as the illumination state of the lens unit 30. Moreover, although the shape of the light guide plate 20 shown in FIGS. 1 and 2 is different from that shown in FIGS. 5 and 6, an illumination state of the lights emitted by the LEDs 10 (11 and 12) is the same regardless of the shape and is an illumination state described below even if the light guide plate 20 is not placed.

As shown in FIG. 1, at part of the one end portion of the mobile phone, a pair of RGB LEDs 11 and 12 are arranged so as to face the light guide plate 20, namely, so as to face the lens unit 30. To be specific, although the side of the upper end face of the light guide plate 20 denoted by reference numeral 20a in FIG. 3 is the side of the surface of the housing and an illuminated face of the lens unit 30 is located there, the RGB LEDs 11 and 12 in this exemplary embodiment are arranged more diagonally as compared with in FIG. 3 so as not to cause lights perpendicularly emitted to the illuminated face (20a) to enter as shown in FIG. 3 but to cause lights diagonally emitted to the illuminated face (20a) to enter as shown in FIG. 1.

With the abovementioned configuration, as denoted by reference numeral 21 in FIG. 1, the area of the illuminated face illuminated by one RGB LED 12 is larger than in FIG. 3. Thus, even if a blocking object 50 such as a screw boss formed inside the housing is placed close to the light guide plate 20, namely, close to the lens unit 30, the light emitted by the RGB LED 12 comes behind the blocking object 50. In other words, it is possible to illuminate the illuminated face of the lens unit 30 located behind the blocking object 50, and it is possible to illuminate the lens unit 30 in a wide range by a small number of RGB LEDs.

A comparison example with the present invention is shown in FIGS. 3 and 4. In FIG. 3, the RGB LEDs 11 and 12 are arranged so as to cause lights perpendicularly emitted to the illuminated face (20a) to enter and, in this case, unilluminated ranges 23 and 24 that are not illuminated with the lights emitted by the RGB LEDs 11 and 12 are made because of existence of the blocking object 50 and narrow illumination ranges. Moreover, even when the RGB LEDs 11 and 12 are arranged by making the locations thereof farther from the illuminated face as shown in FIG. 4, an unilluminated range is still made because of existence of the blocking object 50.

On the other hand, according to the present invention, by arranging the RGB LEDs 11 and 12 so that illumination directions of the lights emitted thereby become not substantially perpendicular but diagonal to the illuminated face as described above, it is possible to make the illumination ranges of the LEDs 11 and 12 broader, and it is possible to illuminate a part of the lens unit 30 in which the blocking object 50 is close thereto. As a result, it is possible to evenly illuminate the lens unit 30 by a small number of RGB LEDs 11 and 12, it is possible to increase a visual effect for users at low cost, and it is possible to increase product competitiveness. Moreover, because the interval between the illumination plate 20 and the RGB LEDs 11 and 12 can be narrow, it is possible to save a space, and it is possible to make the mobile phone small in size.

Further, in this exemplary embodiment, the RGB LEDs 11 and 12 are arranged so that the lights emitted thereby partly overlap each other. For example, as denoted by reference numeral 22 in FIG. 2, the RGB LEDs 11 and 12 are arranged to face in directions set so that about one third or about one half of the light emitted by the RGB LED 11 overlaps about one third or about one half of the light emitted by the RGB LED 12. Consequently, the RGB LEDs 11 and 12 illuminate the illuminated face with a monochromatic light in which the lights are not overlapped and a mixed light in which the lights are overlapped, with the result that the lens unit 30 can light gradationally with more colors of lights than red (R), green (G) and blue (B) lights that can be emitted by the LEDs 11 and 12.

Because each of the abovementioned RGB LEDs 11 and 12 is placed so that the other RGB LED is placed only on one side thereof, it is preferable in this case to arrange the RGB LEDs 11 and 12 to face in directions set so that about one third of the RGB LED 11 overlaps about one third of the RGB LED 12.

Furthermore, in a case, which is not shown in the drawings, that other RGB LEDs are arranged on both sides of a predetermined RGB LED, it is preferable to arrange the respective RGB LEDs so that about one half of the light emitted by the predetermined RGB LED overlaps part of the light emitted by each of the other RGB LEDs. Consequently, for example, it becomes possible to generate seven colors of gradational lights, and it is possible to emit many colors of lights with efficiency while limiting the number of the mounted LEDs. In this case, an LED in which the respective colors (red (R), green (G) and blue (B)) are arranged in any order, for example, arranged in order of "GRB" may be used as the RGB LED.

Thus, according to the present invention, it is possible to cause electronic equipment such as a mobile phone to gradationally light in many colors by using a small number of LEDs, it is possible to increase the visual functionality at low cost, and it is possible to produce a product having high user satisfaction.

<Supplementary Notes>

The whole or part of the exemplary embodiments disclosed above can be described as the following supplementary notes. Below, the overview of configurations of electronic equipment according to the present invention will be described. However, the present invention is not limited to the following configurations.

(Supplementary Note 1)

Electronic equipment including:

an illumination unit that is mounted so as to form a surface of a housing and is capable of transmitting a light from inside the housing to outside; and a light-emitting unit that emits a light to the illumination unit from inside the housing and is mounted inside the housing, wherein the light-emitting unit includes a plurality of RGB LEDs (Light Emitting Diodes) that can emit red, green and blue lights, and the respective RGB LEDs are arranged so that part of a light emitted to the illumination unit by a predetermined one of the RGB LEDs and part of a light emitted to the illumination unit by another of the RGB LEDs overlap each other before entering the illumination unit.

(Supplementary Note 2)

The electronic equipment according to Supplementary Note 1, wherein the respective RGB LEDs are arranged so that lights emitted to the illumination unit by the respective RGB LEDs overlaps each other by about one third to about one half.

(Supplementary Note 3)

The electronic equipment according to Supplementary Note 2, wherein the respective RGB LEDs are arranged so that about one third of a light emitted to the illumination unit by a predetermined RGB LED, only on one side of which another of the RGB LEDs is located, of the RGB LEDs overlaps part of a light emitted to the illumination unit by the other RGB LED.

(Supplementary Note 4)

The electronic equipment according to Supplementary Note 2, wherein the respective RGB LEDs are arranged so that about one half of a light emitted to the illumination unit by a predetermined RGB LED, on both sides of which others of the RGB LEDs are located, of the RGB LEDs overlaps part of respective lights emitted to the illumination unit by the other RGB LEDs that are located on both the sides of the predetermined RGB LED.

(Supplementary Note 5)

The electronic equipment according to any of Supplementary Notes 1 to 4, wherein the respective RGB LEDs can be arranged in a state that LEDs emitting respective colors of lights are placed in any order.

(Supplementary Note 6)

The electronic equipment according to any of Supplementary Notes 1 to 5, wherein the respective RGB LEDs are arranged so that a close portion of the illumination unit to a predetermined member located inside the housing can be illuminated with lights emitted by the RGB LEDs from inside the housing.

(Supplementary Note 7)

A mobile phone including:

an illumination unit that is mounted so as to form a surface of a housing and is capable of transmitting a light from inside the housing to outside; and a light-emitting unit that emits a light to the illumination unit from inside the housing and is mounted inside the housing, wherein the light-emitting unit includes a plurality of RGB LEDs (Light Emitting Diodes) that can emit red, green and blue lights, and the respective RGB LEDs are arranged so that part of a light emitted to the illumination unit by a predetermined one of the RGB LEDs and part of a light emitted to the illumination unit by another of the RGB LEDs overlap each other before entering the illumination unit.

(Supplementary Note 8)

The mobile phone according to Supplementary Note 7, wherein the respective RGB LEDs are arranged so that lights emitted to the illumination unit by the respective RGB LEDs overlaps each other by about one third to about one half.

The present invention is based upon and claims the benefit of priority from Japanese patent application No. 2010-251388, filed on Nov. 10, 2010, the disclosure of which is incorporated herein in its entirety by reference.

DESCRIPTION OF REFERENCE NUMERALS 10, 11, 12 RGB LED
20 illumination plate
20a illuminated face
30 lens unit
50 blocking object

The invention claimed is:

1. A mobile phone comprising:

an illumination unit that is mounted so as to form a surface of a housing of the mobile phones and is capable of transmitting a light from inside the housing to outside; and a light-emitting unit that emits a light to the illumination unit from inside the housing and is mounted inside the housing, wherein the light-emitting unit includes a plurality of RGB LEDs (Light Emitting Diodes) that can emit red, green and blue lights, and the respective RGB LEDs are arranged such that illumination directions of the RGB LEDs are diagonal to an illuminated face of the illumination unit so that part of a light emitted to the illumination unit by a predetermined one of the RGB LEDs and part of a light emitted to the illumination unit by another of the RGB LEDs overlap each other before entering the illumination unit, and the respective RGB LEDs are arranged on a first side of a blocking object formed inside the housing so that lights emitted by the respective RGB LEDs shine beyond the blocking object and illuminate and illuminated face located on a second side of the blocking object.

2. The mobile phone according to claim 1, wherein the respective RGB LEDs are arranged so that lights emitted to the illumination unit by the respective RGB LEDs overlaps each other by about one third to about one half.

3. The mobile phone according to claim 2, wherein the respective RGB LEDs are arranged so that about one third of a light emitted to the illumination unit by a predetermined RGB LED, only on one side of which another of the RGB LEDs is located, of the RGB LEDs overlaps part of a light emitted to the illumination unit by the other RGB LED.

4. The mobile phone according to claim 2, wherein the respective RGB LEDs are arranged so that about one half of a light emitted to the illumination unit by a predetermined RGB LED, on both sides of which others of the RGB LEDs are located, of the RGB LEDs overlaps part of respective lights emitted to the illumination unit by the other RGB LEDs that are located on both the sides of the predetermined RGB LED.

5. The mobile phone according to claim 1, wherein the respective RGB LEDs can be arranged in a state that LEDs emitting respective colors of lights are placed in any order.

6. The mobile phone according to claim 1, wherein the respective RGB LEDs are arranged so that a close portion of the illumination unit to a predetermined member located inside the housing can be illuminated with lights emitted by the RGB LEDs from inside the housing.

* * * * *